United States Patent [19]
Mizuno et al.

[11] Patent Number: 5,197,779
[45] Date of Patent: Mar. 30, 1993

[54] POWER SLIDING SUNROOF

[75] Inventors: Eiichi Mizuno; Koji Kishino; Kenji Matsumoto, all of Hiroshima; Toshio Hasuike, Iwakuni, all of Japan

[73] Assignee: Mazda Motor Corporation, Hiroshima, Japan

[21] Appl. No.: 772,125

[22] Filed: Oct. 9, 1991

Related U.S. Application Data

[63] Continuation of Ser. No. 543,962, Jun. 27, 1990, abandoned.

[30] Foreign Application Priority Data

Jun. 27, 1989 [JP] Japan ................. 1-164896
Aug. 4, 1989 [JP] Japan ................. 1-92099
Aug. 9, 1989 [JP] Japan ................. 1-93665

[51] Int. Cl.⁵ ............................................ B60J 7/047
[52] U.S. Cl. ..................................... 296/220; 296/216; 296/222; 296/223
[58] Field of Search ................. 296/216, 220, 222, 223

[56] References Cited

U.S. PATENT DOCUMENTS

| | | | |
|---|---|---|---|
| 1,854,972 | 4/1932 | Austin | 296/220 X |
| 4,498,701 | 2/1985 | Queveau | 296/220 X |
| 4,619,480 | 10/1986 | Motoyama et al. | 296/222 |
| 4,707,022 | 11/1987 | Roos et al. | 296/222 |
| 5,029,937 | 7/1991 | Yamamoto | 296/223 |

FOREIGN PATENT DOCUMENTS

| | | | |
|---|---|---|---|
| 0253632 | 1/1988 | European Pat. Off. | 296/216 |
| 1946161 | 3/1971 | Fed. Rep. of Germany | 296/222 |
| 3802380 | 8/1988 | Fed. Rep. of Germany | 296/220 |
| 3725982 | 2/1989 | Fed. Rep. of Germany | 296/216 |
| 0164812 | 10/1982 | Japan | 296/220 |
| 0078827 | 5/1983 | Japan | 296/220 |
| 0187619 | 8/1987 | Japan | 296/220 |
| 63-43820 | 3/1988 | Japan | |
| 1411305 | 10/1975 | United Kingdom | 296/222 |

*Primary Examiner*—Dennis H. Pedder
*Attorney, Agent, or Firm*—Keck, Mahin & Cate

[57] ABSTRACT

A skylight window formed in a top roof of an automotive car body is either fully or partly opened and closed by front and rear sliding roof portions. The front and rear sliding roof portions, or roofs, each independently moves between closed and open positions. The front sliding roof is guided to its open position by front roof guide mechanisms disposed on opposite sides of the skylight window so as to locate the front sliding roof over a rear stationary roof in the open position. The rear sliding roof is guided to its open position by rear guide mechanisms disposed on opposite sides of the skylight window so as to locate the rear sliding roof under the rear stationary roof in the open position. These front and rear sliding roofs, when closed, are even with a plane including the top roof of the card body.

11 Claims, 15 Drawing Sheets

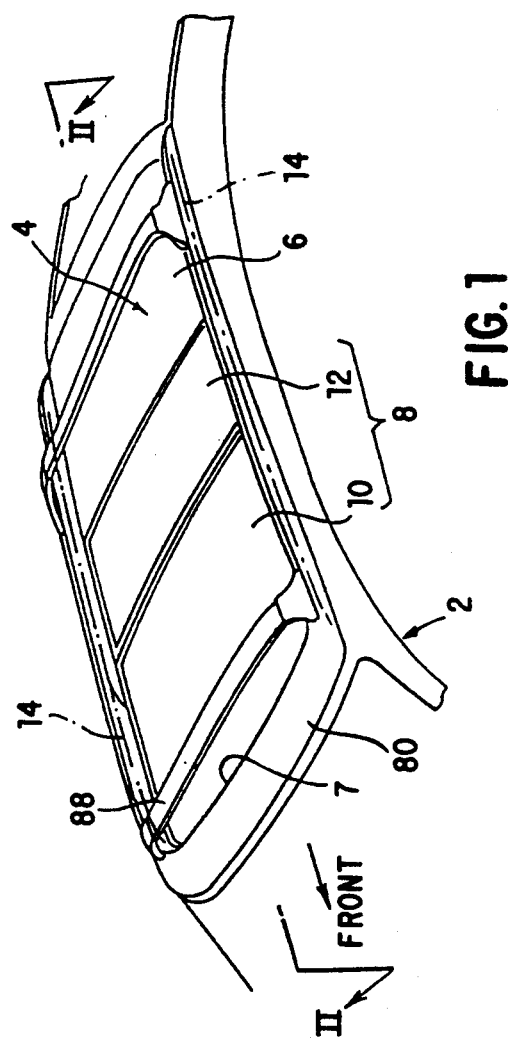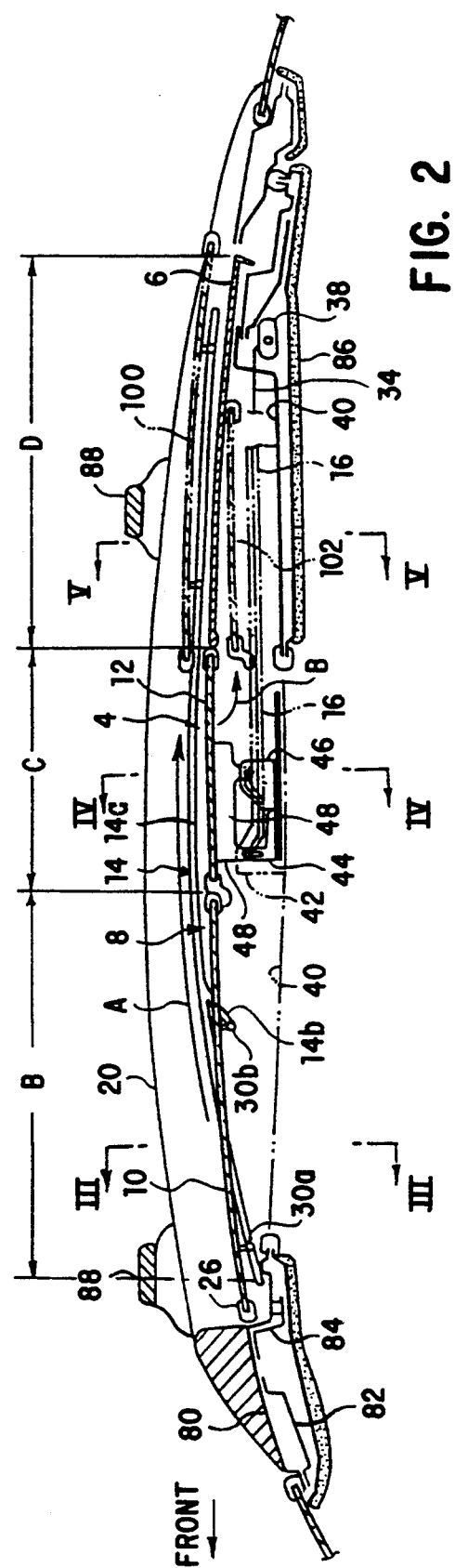

FIG. 8A
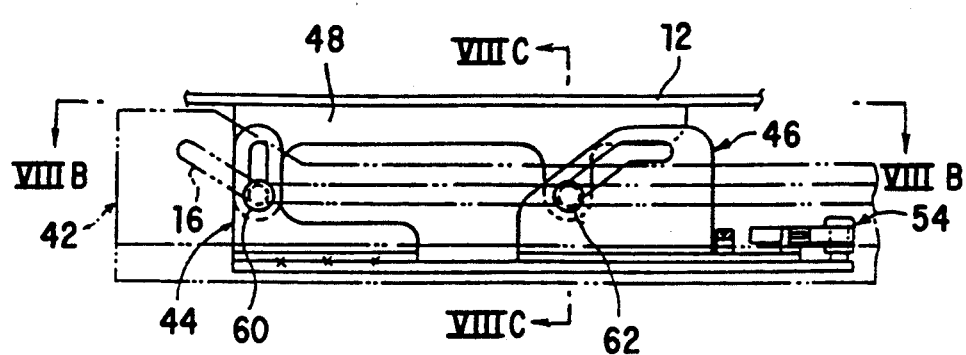
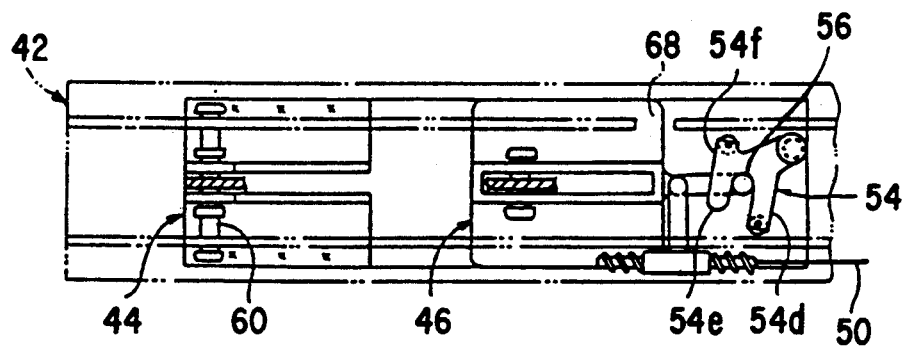
FIG. 8B
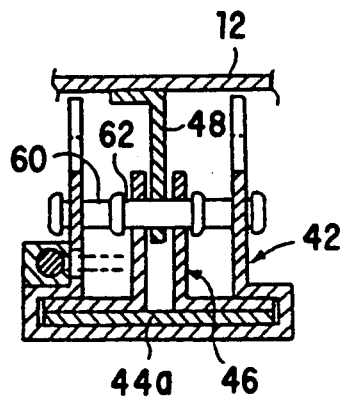
FIG. 8C

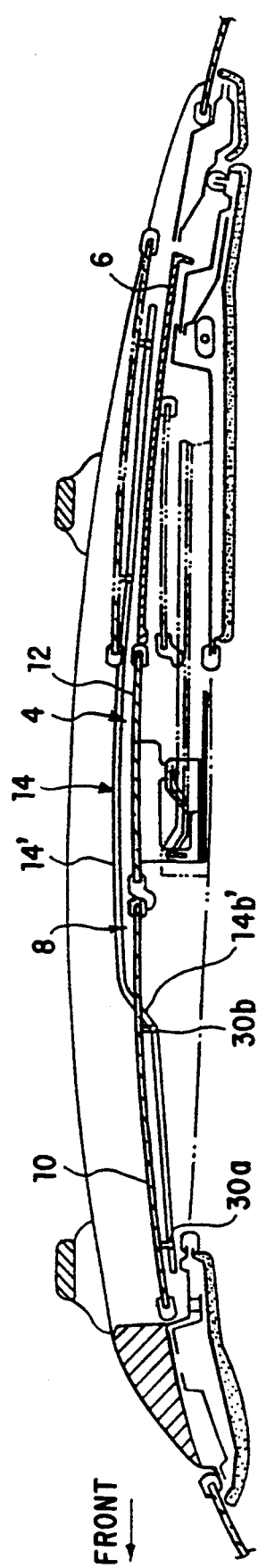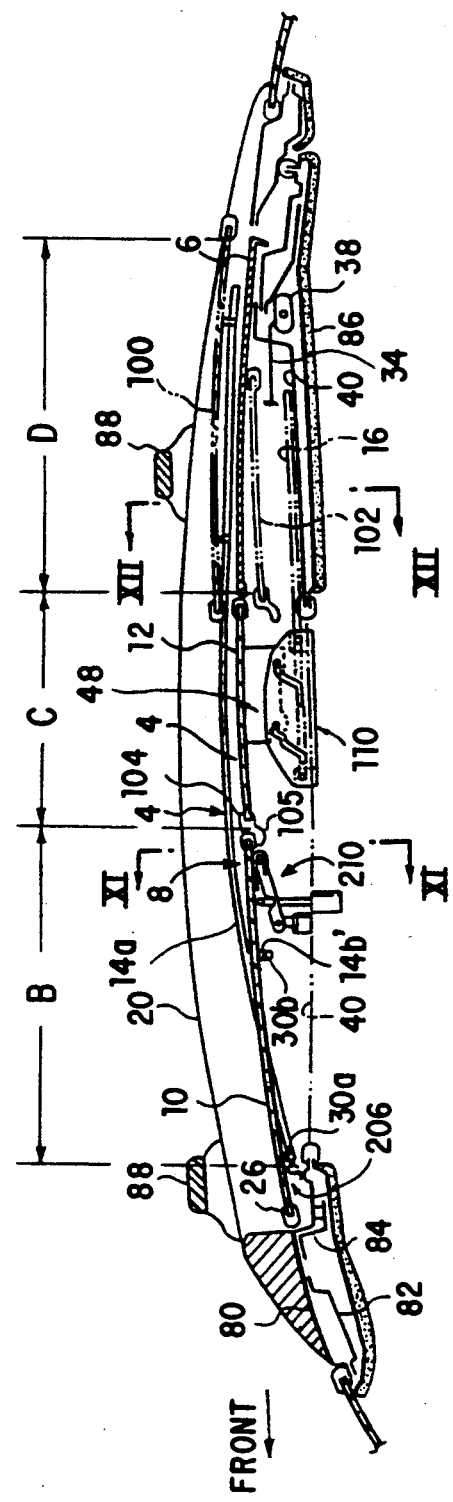

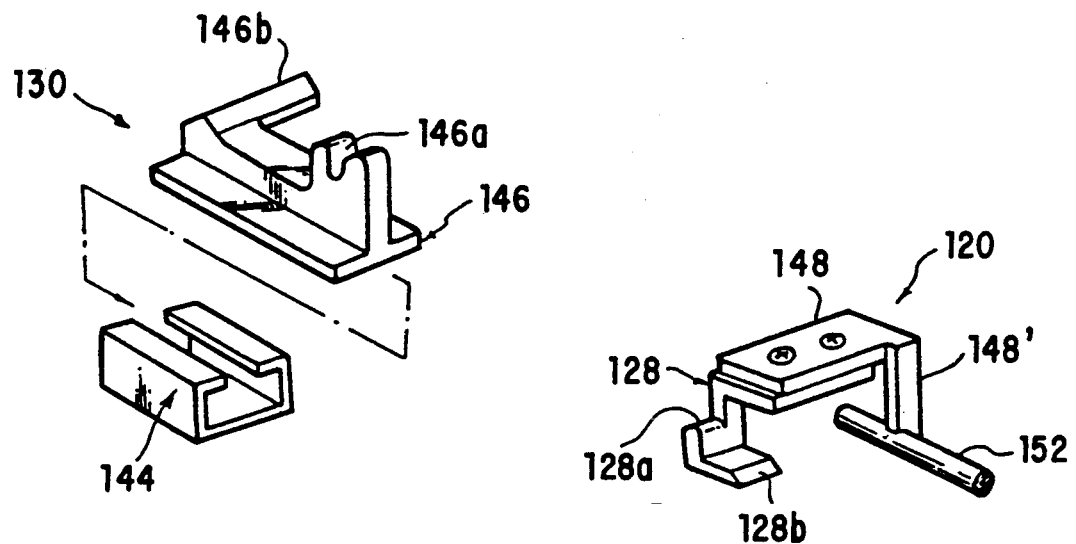
FIG. 18
FIG. 19
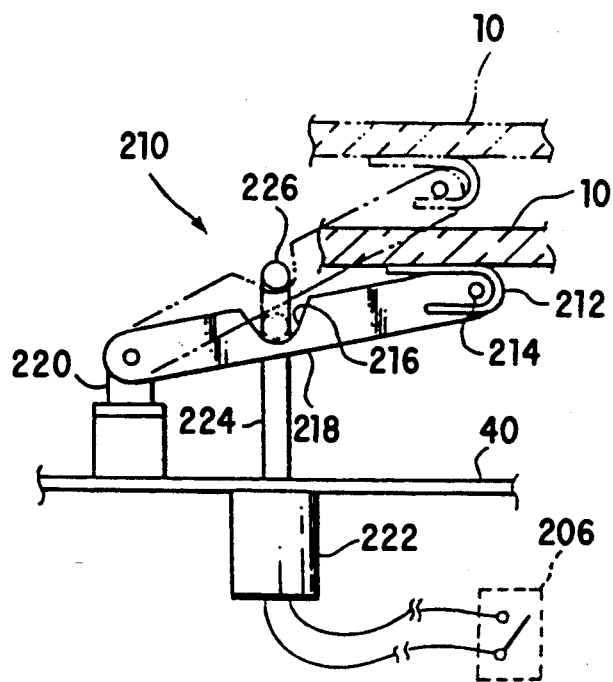
FIG. 20

FIG. 26A
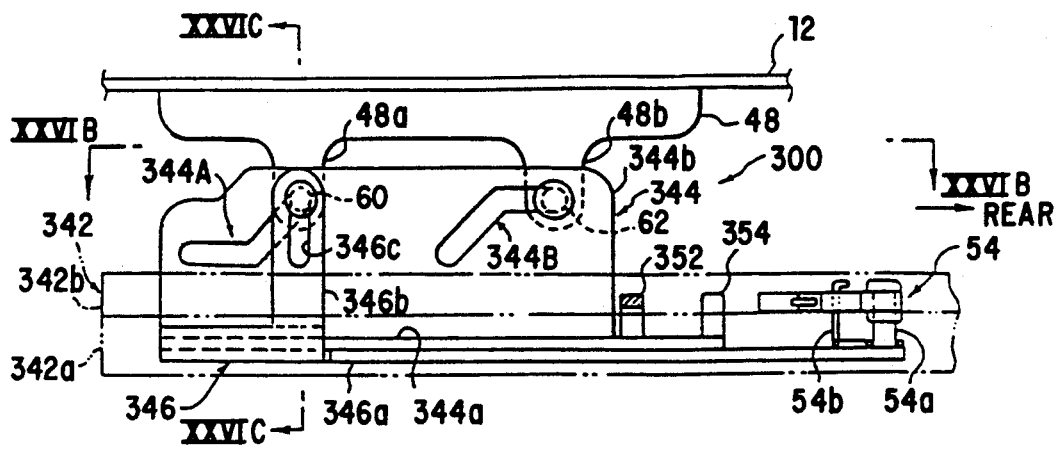
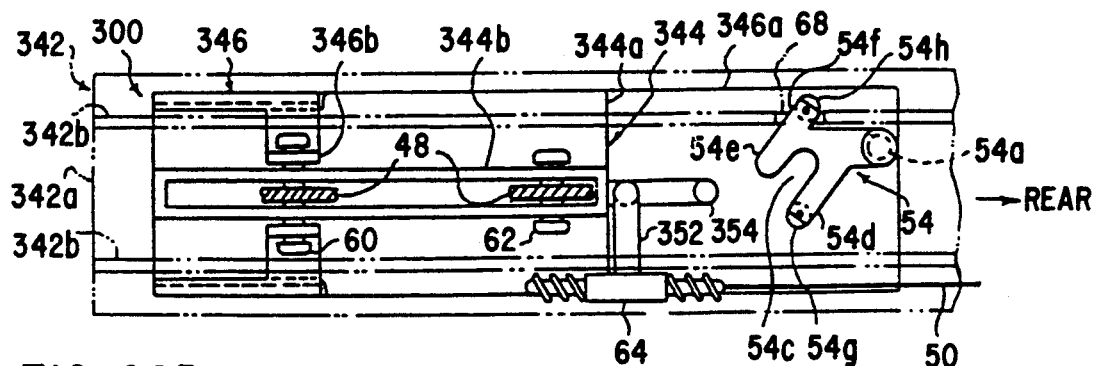
FIG. 26B
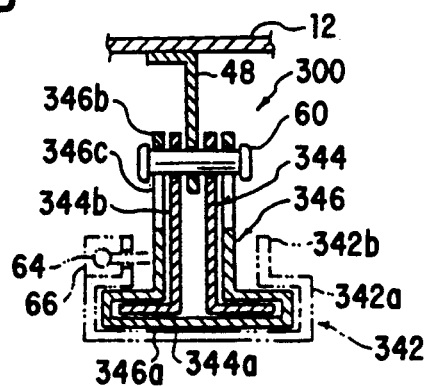
FIG. 26C

POWER SLIDING SUNROOF This is a continuation of application Ser. No. 07/543,962, filed Jun. 27, 1990, now abandoned.

The present invention relates to a power sliding sunroof for an automotive vehicle and, more particularly, to a power sliding sunroof having front and rear sliding roof portions, or roofs.

BACKGROUND OF THE INVENTION

One known type of sliding sunroof has front and rear sliding roofs. Such a sliding sunroof, typically referred to as a double sliding sunroof, includes linkages which move the front and rear sliding roofs separately on a pair of guide rails. In more detail, one of the linkages first pushes the rear sliding roof up and moves it under a fixed roof and then the other linkage tilts the front sliding roof up and moves it over the fixed roof. Such a sliding sunroof is disclosed by Japanese Utility model Application No. 61(1986)-136670, entitled "Sunroof Apparatus," filed on Sep. 8, 1986 and laid open as Japanese Unexamined Utility Model Publication No. 63(1988)-43820 on Mar. 24, 1988.

Since, in the sunroof apparatus described in this publication, the front sliding roof and rear sliding roof are moved backward over and under the fixed roof, respectively, on the same pair of guide rails by the respective linkages, the front sliding roof cannot be opened with the rear sliding roof closed until the rear sliding roof has first been opened. Furthermore, since each guide rail of the pair of guide rails partly extends under the fixed roof, the linkage, which is connected to front part of the front sliding roof, must be disposed in front of the front edge of the fixed roof when the front sliding roof has opened over the fixed roof, and the sunroof is not able to be opened to its full extent.

SUMMARY OF THE INVENTION

It is, therefore, the primary object of the present invention to provide a sliding sunroof having front and rear sliding roofs which are independently movable to open a skylight window of an automotive vehicle.

It is a further object of the present invention to provide a sliding sunroof which can be opened over the full length of a skylight window of an automotive vehicle.

The above and other objects and features of the present invention are achieved by providing a sliding sunroof which comprises front and rear sliding roofs which are movable independently of each other to open and close a skylight window formed between front and rear stationary roof portions, or roofs, of the top roof of an automotive vehicle. The front sliding roof is movable between a front roof closed position and a front roof open position, while the rear sliding roof is movable between a rear roof closed position and a rear roof open position.

The top roof of the vehicle is provided with a pair of roof guide means disposed on opposite sides of the skylight window to guide the movement of the front and rear sliding roofs. Each guide means comprises a front roof guide track for guiding the front sliding roof between the front roof closed and open positions, and a rear roof guide track for guiding the rear sliding roof between the rear roof closed and open positions. The front guide track includes at least a guide track section extending above and over the rear sliding roof in the rear roof closed position so that the front sliding roof, when opened, is located above and over the rear stationary roof. The full length of the rear roof guide track extends under the rear stationary roof so that the rear sliding roof, when opened, is located under the rear stationary roof.

BRIEF DESCRIPTION OF THE DRAWINGS

The above and other objects and features of the present invention will be apparent from the following description of preferred embodiments when considered in conjunction with the appended drawings, wherein similar reference numerals have been used to designate the same or similar elements throughout the drawings and in which:

FIG. 1 is a schematic illustration, partly showing a car body with a sliding sunroof in accordance with a preferred embodiment of the present invention;

FIG. 2 is a cross-sectional view of the sliding sunroof of FIG. 1 as seen along line II—II, in which front and rear sliding roofs are closed;

FIG. 8A is a side view of the sliding mechanism in a pre-opening position;

FIG. 8B is a cross-sectional view of FIG. 8A as seen along line IIXB—IIXB;

FIG. 8C is a cross-sectional view of FIG. 8A as seen along line IIXC—IIXC;

FIG. 9 is a schematic illustration, similar to FIG. 1, showing a variant of the sliding sunroof of FIG. 1, in which a modified guide track is provided;

FIG. 10 is a cross-sectional view showing a sliding sunroof in accordance with another preferred embodiment of the present invention, in which front and rear sliding roofs are closed;

FIG. 18 is an exploded perspective view showing a stopper mechanism;

FIG. 19 is a perspective view, partly showing a part of a drive mechanism for the rear sliding roof;

FIG. 20 is a side view showing a tilt down mechanism for the front sliding roof;

FIG. 26A is a side view of a sliding mechanism for the rear sliding roof which is in a closed position., FIG. 26B is a cross-sectional view of FIG. 26A as seen along line XXVIB—XXVIB;

FIG. 26C is a cross-sectional view of FIG. 26A as seen along line XXVIC—XXVIC;

DESCRIPTION OF THE PREFERRED EMBODIMENTS

Figure 6A:
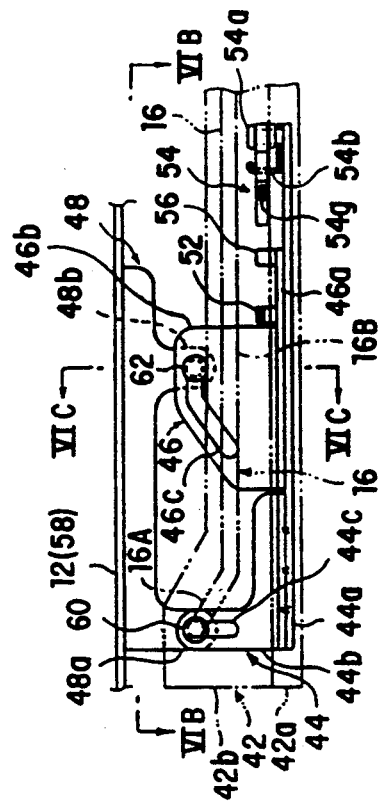
FIG. 6A is a side view of a sliding mechanism for the rear sliding roof while the roof in the closed position.

Referring to the drawings in detail, in particular to FIG. 1, a top roof of a car body having a power sliding sunroof according to a preferred embodiment of the present invention is shown. The top roof 4 of the car body 2 consists of front and rear stationary roof portions, or roofs, 80 and 6 and a sliding sunroof 8 for opening and closing a skylight window 7 formed in the top roof 4 between the front and rear stationary roofs 80 and 6. The sliding sunroof 8 comprises front and rear sliding roof portions, or roofs, 10 and 12 which independently slide back and forth on guide tracks 14 and 16 disposed under carrier base 20 on opposite sides of the skylight window 7 to open and close the skylight window 7. The front and rear sliding roofs 10 and 12, as will be described in detail later, when opening, independently move backward over and under the rear stationary roof 6 of the roof 4, respectively.

Referring to FIG. 2, the sliding sunroof 8, when closed, is even with the front and rear stationary roofs 80 and 6 so as to form a slightly curved top roof 4. The guide tracks 14 for the front sliding roof 10 are at the same level and parallel to each other. Each guide track 14 curves gently from the front to the rear of the skylight window 7 and consists of three guide track sections B, C and D in order from the front of the roof 4 toward the rear. The guide track section B extends with its major part 14a located over the front sliding roof 10 in a closed position and crossing, near its front end, a plane including the front sliding roof 10 without any interference with the front sliding roof 10. The guide track sections C and D extend over the rear sliding and stationary roofs 12 and 6 and above a plane including the rear sliding and stationary roofs 12 and 6. As is illustrated in FIGS. 1 and 2, the front stationary roof 80 is located over a front head member 82 and a fixing plate 84. The top roof 4 is provided, at front and rear parts thereof, with carrier bars 88.

It is to be noted that because both of the guide tracks 14 are the same in structure and function as each other, the following description is directed to one of the guide tracks only.

The guide track 14 is formed as a slot or groove in a guide frame 18. Before the transitional point between the guide track sections B and C, the guide frame 18 is formed with a turnout track 14b branching off from the guide track section B and extending forwardly and down at an acute angle smaller than about 45 degrees with respect to the guide track section B. The front sliding roof 10 has, at the front and middle portions thereof, front and rear guide shoes 30a and 30b, respectively, which slidably engage with the guide track 14 and turnout track 14b, respectively, when the front sliding roof 10 is in the closed position. The guide frame 18 is supported and concealed by the carrier 20 which is fixed to the outer surface of the roof 4 on each side of the skylight window 7 and extends along the full length of the skylight window 7.

Figure 3:
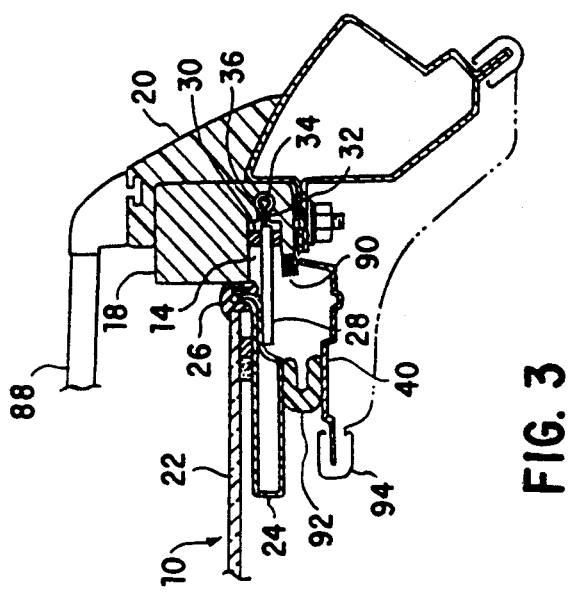
FIG. 3 is a cross-sectional view of FIG. 2 as seen along line III—III.

The front sliding roof 10, as is clearly shown in FIG. 3, comprises a transparent roof glass 22, left and right side frames 24 for holding the roof glass 22 and a seal member 26 disposed between the roof glass 22 and frames 24. Each frame 24 is provided with a pair of guide pins 28 laterally extending from each side thereof. Each guide pin 28 is attached with a guide shoe 30 (which is shown as a front guide shoe 30a or a rear guide shoe 30b in FIG. 2) slidably received in the guide track 14 formed as a groove in the guide frame 18. The guide pin 28 is connected to a drive cable 34 by a connecting member 32 laterally extending from the guide pin 28.

The drive cable 34 is received in a groove 36 formed in the guide frame 18 and is operationally coupled to an electric reversible motor 38 (which is hereinafter referred to as a front roof drive motor) for driving the front sliding roof 10. When the front roof drive motor 38 turns in one direction, the front sliding roof 10 is moved backward to open the skylight window 7. Conversely, when the front roof drive motor 38 turns in the opposite or reverse direction, the front sliding roof 10 is moved forward to close the skylight window 7.

Figure 4:
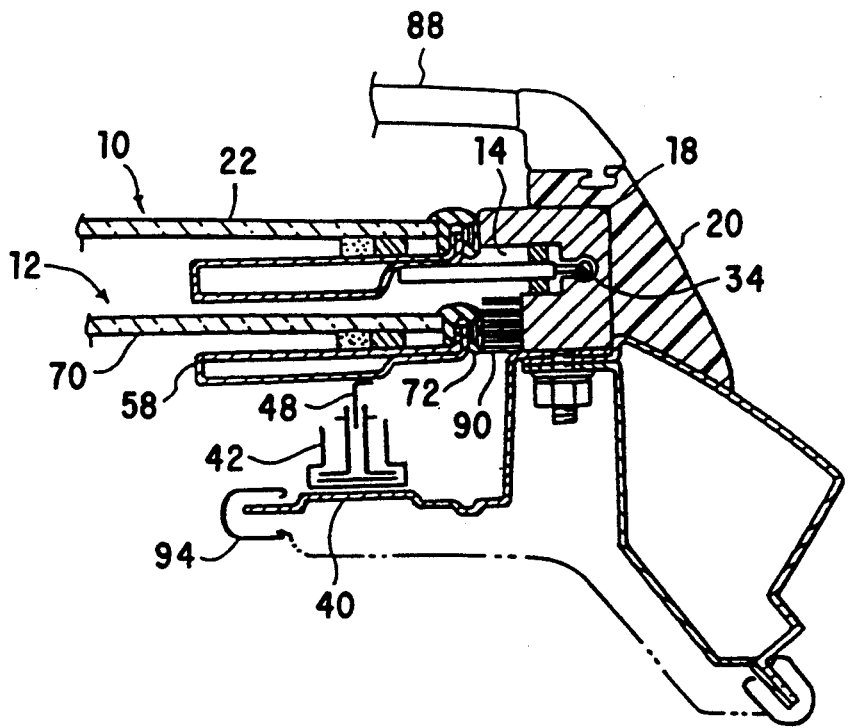
FIG. 4 is a cross-sectional view of FIG. 2 as seen along line IV—IV, in which the front sliding roof is in an open position and the rear sliding roof is in a closed position.
Figure 5:
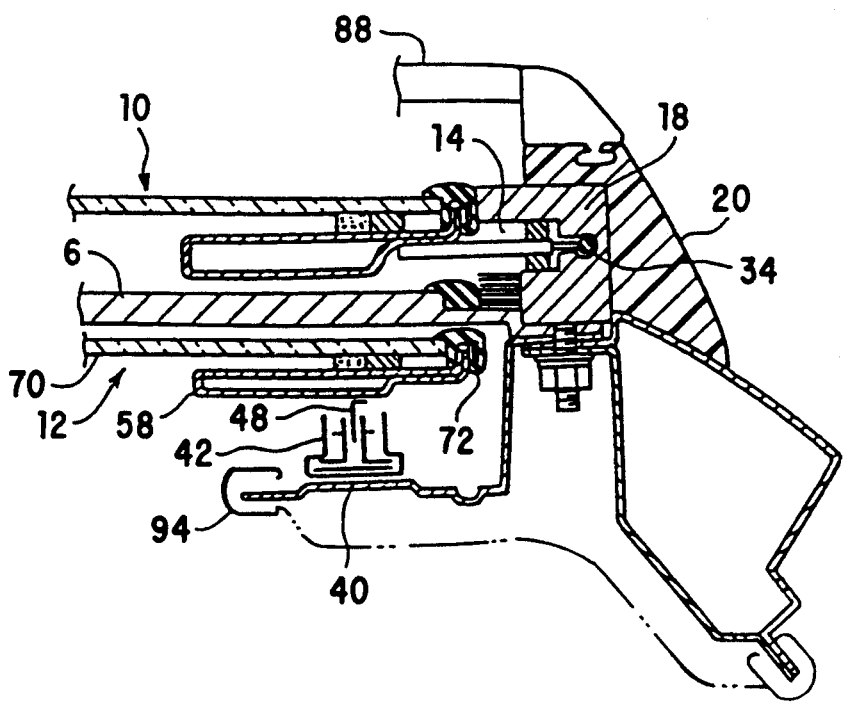
FIG. 5 is a cross-sectional view of FIG. 2 as seen along line V—V, wherein the front and rear sliding roofs are in their open positions.

Referring to FIGS. 2, 4 and 5, the top roof 4, which has a lower roof panel 40 formed with an opening enclosed by a seaming welt 94 which defines the skylight window 7, supports thereon guide frames 42 on opposite sides of the opening. Each guide frame 42, located under the rear sliding roof 12 in the closed position and the rear stationary roof 6, has a guide track 16 formed as a slot which consists of a front track portion 16A inclined rearwardly and down and a rear track portion 16B extending horizontally from the rear end of the front track portion 16A. The guide frame 42 is engaged with the rear sliding roof 12 by rear sliding roof tilt means which, as will be described in detail later, comprises a front end tilt bracket 44, a rear end tilt bracket 46 and a roof bracket 48.

Figure 6B:
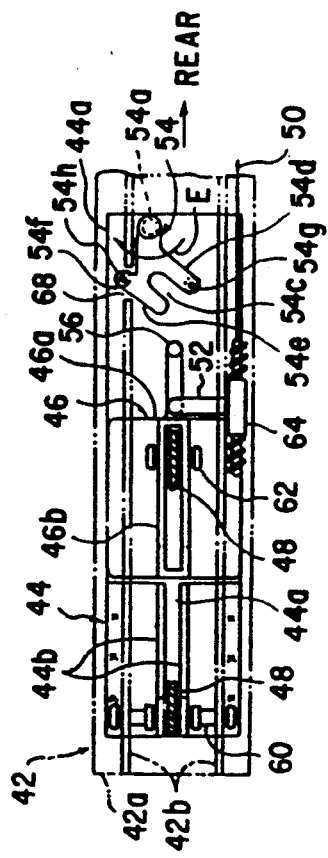
FIG. 6B is a cross-sectional view of FIG. 6A as seen along line VIB—VIB.
Figure 6C:
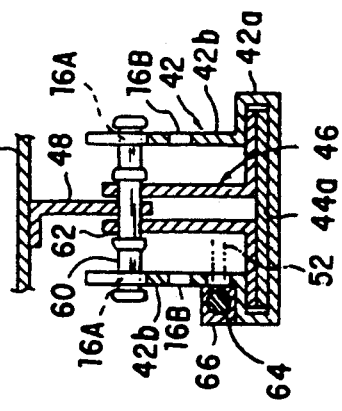
FIG. 6C is a cross-sectional view of FIG. 6A as seen along line VIC—VIC.

As is shown in FIGS. 6A to 6C, the guide frame 42 comprises a hollow guide base 42a having a rectangular cross-section and side walls 42b integrally formed with the hollow guide base 42a to provide a space therebetween. The guide track 16, in the shape of a slot, is formed in each side wall 42b of the guide frame 42.

As is clearly seen in FIGS. 6A and 6B, the front end tilt bracket 44 comprises a base plate 44a and a pair of, or inner and outer, L-shaped bracket members 44b. The base plate 44a, which extends from the front end of the front end tilt bracket 44 beyond the rear end tilt bracket 46, is received in the hollow guide base 42a for lengthwise sliding movement. The outer and inner bracket members 44b, formed with vertical guide slots 44c, are arranged face to face with a certain clearance therebetween and are secured to a base plate 44a with their laterally extending foot sections welded at several points. The rear end tilt bracket 46 comprises a base plate 46a and a pair of, or outer and inner, L-shaped bracket members 46b. The base plate 46a, which is placed on the base plate 44a of the front end tilt bracket 44, is usually slidable relative to the base plate 44a of the front end tilt bracket 44 in the hollow guide base 42a within a certain distance or, under certain conditions, is slidable together with the base plate 44a of the front end tilt bracket 44. The outer and inner bracket members 46b are arranged face to face with a certain clearance therebetween and are secured to a base plate 46a with their laterally extending foot sections welded at several points. Each bracket member 46b is formed with a guide slot 46c consisting of an inclined front guide slot section and a horizontal rear guide slot section. The base plate 46a is provided, at its rear end, with a connecting arm 52 by which the base plate 46a is connected to a drive cable 50 and is further provided with a coupling pin 56 engageable with a swingable hook 54 which will be described in detail later.

The roof bracket 48 is, on one hand, firmly attached to front part of the rear sliding roof 12 by a frame 58 which will be described later and, on the other hand, is connected or coupled to the front and rear end tilt brackets 44 and 46 by front and rear connecting pins 60 and 62, respectively. In more detail, the roof bracket 48 supports the front and rear connecting pins 60 and 62 fixed to front and rear arms 48a and 48b thereof, respectively. These front and rear connecting pins 60 and 62 are slidably received, at their ends, in the guide slots 44c and 46c of the front and rear end tilt brackets 44 and 46, respectively.

The drive cable 50 is attached to a guide shoe 64 which is connected to the connecting arm 52 of the base plate 46a of the rear end tilt bracket 46. This drive cable 50, which is concealed together with the guide shoe 64 in a guide channel 66 (see FIG. 6C) extending in the lengthwise direction of the guide frame 42, is connected to an output shaft of an electric, reversible rear roof drive motor, which is located side by side behind the drive motor 38 shown in FIG. 2. The drive cable 50 thereby operationally couples the base plate 46a to the rear roof drive motor, so as to move the base plate 46a in the lengthwise direction when the motor is actuated.

The swingable hook 54 is mounted on a shaft 54a standing vertically at rear part of the base plate 44a of the rear end tilt bracket 44 for pivotal movement and is urged in a counterclockwise direction shown by an arrow E in FIG. 6B by a coil spring 54b. The hook 54 is integrally formed with first and second arms 54d and 54e to define therebetween a coupling recess 54c engageable with the coupling pin 56 of the base plate 46a integral with the rear end tilt bracket 46. The hook is further integrally formed with a third arm 54f engageable with a notch 68 formed in one side wall 42b of the guide frame 42. The first and third arms 54d and 54f are provided with rollers 54g and 54h, respectively.

The rear sliding roof 12 comprises, similar to the front sliding roof 10, a transparent roof glass 70, left and right side frames 58 for holding the roof glass 70 and a seal member 72 disposed between the roof glass 70 and each side frame 58. The side frames 58 are firmly attached with the roof bracket 48 secured to the rear sliding roof 12. Designated by reference numerals 90, 92 in FIGS. 3 to 5 are a dust barrier and a weather strip, respectively.

When it is desired to open partly the skylight window 7 by moving or sliding the front sliding roof 10, the front roof drive motor 38 is actuated to move the guide shoes 30 toward the back of the roof 4 along the guide tracks 14 through the drive cable 34. At the beginning of backward movement of the front sliding roof 10, the rear guide shoes 30b are guided by the turnout tracks 14b to push up the rear end of the front sliding roof 10 above the rear sliding roof 12 so as to tilt up the front sliding roof 10. After the rear guide shoes 30b enter into the major parts of the guide tracks 14, the front sliding roof 10 continuously moves backwards along the guide tracks 14 in the lengthwise direction shown by an arrow A in FIG. 2 until the front end of the front sliding roof 10 is located substantially right above the front end of the rear stationary roof 6 as is shown by a double-dotted line 100 in FIG. 2, thereby partly opening the skylight window 7. While the front sliding roof 10 is moving toward the open position, the rear sliding roof 12 stays at its closed position shown in FIGS. 6A to 6C. The front sliding roof 10 is returned to its original in the reverse manner by simply reversing the front roof drive motor 38.

When it is desired to open the skylight window 7 either partly, leaving the front sliding roof 10 closed, or fully after having opened the front sliding roof 10, the rear sliding roof 12 is moved. The window 7 can be opened by moving the rear sliding roof 12 while leaving the front sliding roof 10 closed. This is done by actuating the rear roof drive motor. It should be noted that when the rear sliding roof 12 is in the closed position, the front end tilt bracket 44 for the rear sliding roof 12 is located at the forefront position where the front connecting pin 60, supported by the roof bracket 48, engages the uppermost end of the guide slot 44c and the front end of the guide track 16 of the guide frame 42. The rear connecting pin 62 is supported by the roof bracket 48 and engages the rear end of the guide slot 46c. Also, the rear end tilt bracket 46 is located at the forefront position where the front end of the rear end tilt bracket 46 is substantially in contact with the rear end of the front end tilt bracket 44. In the closed position of the sunroof 4, the hook 54 is forced by the spring 54b to abut against the side wall 42b of the guide frame 42.

As the rear roof drive motor is actuated, the rear end tilt bracket 46, operationally connected to the drive motor through the connecting arm 52 and the guide shoe 64 connected to the drive cable 50, is moved rearward, sliding on the base plate 44a of the front bracket 44 in the lengthwise direction. During the rearward sliding and after a certain distance of sliding movement of the rear end tilt bracket 46, the connecting pin 56 is brought into engagement with the first arm 54d of the hook 54 and forces it to turn in the counterclockwise direction against the spring 54b until the roller 54g of the first arm 54d abuts against the other side wall 42b of the guide frame 42. During this turning movement, the hook 54 catches the connecting pin 56 in the recess 54c and disengages the third arm 54f thereof from the notch 68 of the one side wall 42b of the guide frame 42. After tilting down the rear sliding roof 12, the rear end tilt bracket 46 and its associated elements are located in the position shown in FIGS. 7A and 7B, which is referred to as a tilt down position.

Figure 7A:
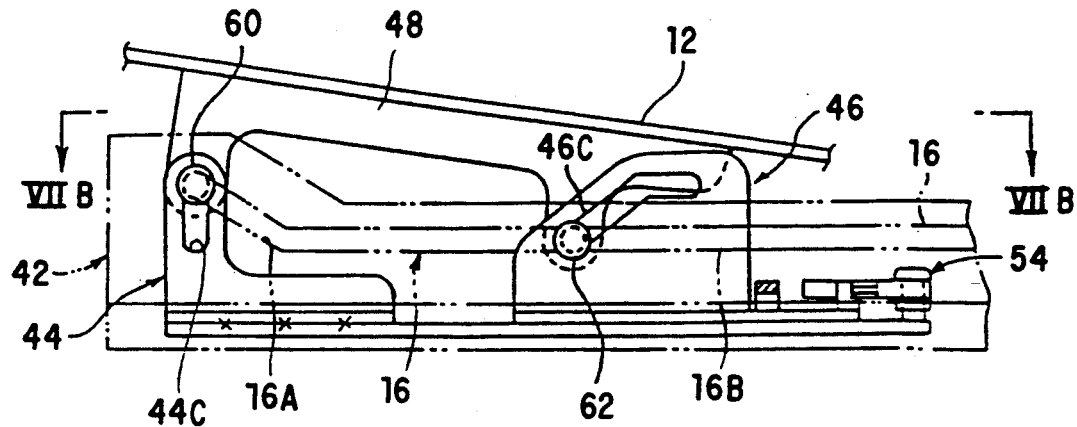
FIG. 7A is a side view, showing the sliding mechanism in a tilt up position.
Figure 7B:
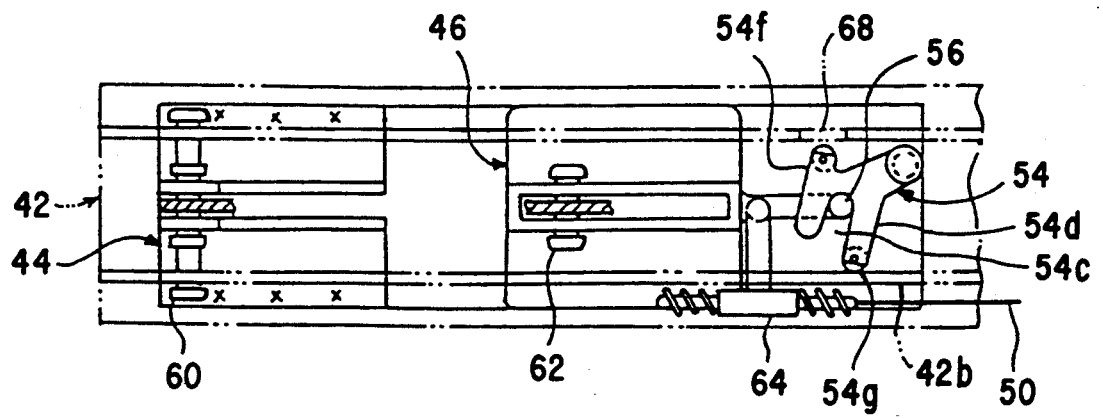
FIG. 7B is a cross-sectional view of FIG. 7A as seen along line VIIB—VIIB.

While the rear end tilt bracket 46 changes its position from the closed position shown in FIG. 6A to its tilt down position shown in FIG. 7A, the rear connecting pin 62 is forced to move forwardly down in the guide slot 46c relative to the rear end tilt bracket 46 to pull down the rear end of the rear sliding roof 12, thereby tilting down the rear sliding roof 12 about the front connecting pin 60 as shown in FIG. 7A. As the rear roof drive motor continuously operates, since the hook 54 is prevented from being further turned in the counterclockwise direction by means of the engagement of the first arm 54g with the other side wall 42b of the guide frame 42 and the disengagement of the third arm 54 out of the notch 68 of the one side wall 42b of the guide frame 42, the backward movement of the rear end tilt bracket 46 caused by the drive cable 50 is transmitted to the front end tilt bracket 44 through the hook 54, so that the front and rear end tilt brackets 44 and 46 are moved backward together. Consequently, the front connecting pin 60 moves rearwardly down in the inclined front track portions 16A of the guide tracks 16 of the guide frames 42, being guided in the guide slots 44c, to pull down the front end of the rear sliding roof 12, so that the rear sliding roof 12 is turned in the counterclockwise direction about the rear connecting pin 62 to level it, or locate it in a pre-opening position, as shown in FIG. 8A. After this leveling, the rear sliding roof 12 slides, while being kept level, to an open position as shown by a double-dotted line 102 in FIG. 2 where it is fully located under the rear stationary roof 6. The rear sliding roof 12 can be closed in a reverse manner, independently of the front sliding roof 10, by reversing the rear roof drive motor.

Referring to FIG. 9, which illustrates an alternate to guide track 14, a guide track 14' has front and rear guide track sections which are at different levels and are connected by a transitional guide track section 14b'. When the rear guide shoe 30b passes through the transitional guide track section 14a, it pushes up the rear end of the rear sliding roof 12 so as to tilt up the front sliding roof 10.

Whereas in the above embodiment, the front sliding roof 10 is directly engaged with the guide tracks 14 or 14' through the guide shoes 30a and 30b so as to be moved over the rear sliding roof 12 and rear stationary roof 6 for opening or closing the skylight window 7, nevertheless, the front sliding roof 10 may be coupled to the guide tracks by the use of a linkage which is adapted to tilt up the rear end of the front sliding roof. Such a linkage may be of any known type.

If it is desirable not to incorporate such a linkage for some reason, such as to keep costs down, it is essential to eliminate interference between the rear end of the front sliding roof 10 and the front end of the rear sliding roof 12, which will possibly occur at the beginning of movement of the front sliding roof 10 toward the rear to open the skylight window 7 while leaving the rear sliding roof 12 closed. For this requirement, the guide track 14 or 14' is provided with turnout track 14b branching off therefrom or transitional guide track section 14b', respectively. The guide shoes 30b are thus pushed up above the top end of the rear sliding roof 12 from the closed position at the beginning of opening of the front sliding roof. Although the provision of turnout track 14b or transitional guide track section 14b' eliminates any interference between the front and rear sliding roofs 10 and 12, the rear sliding roof 12, if desired, may be adapted to slightly move rearward immediately before opening the front sliding roof 10 and return back to its initial closed position immediately after a slight rearward movement of the front sliding roof 10.

When opening fully the skylight window 7, either one of the front and rear sliding roofs 10 and 12 may be opened first. However, it is preferable to open the front and rear sliding roofs 10 and 12 together or the rear sliding roof 12 first in order to eliminate the interference between the front rear sliding roofs.

FIGS. 10 to 22 show a power sliding sunroof in accordance with another preferred embodiment of the present invention. It should first be noted that similar reference numerals have been used to designate elements of the second embodiment which are the same as or similar to elements of the first embodiment described above. Because the power sliding sunroof of the second embodiment has a front and rear sliding roof arrangement which is the same as or similar to that of the first embodiment, the following description will be directed to front and rear roof drive mechanisms which are different from those of the first embodiment.

Figure 11:
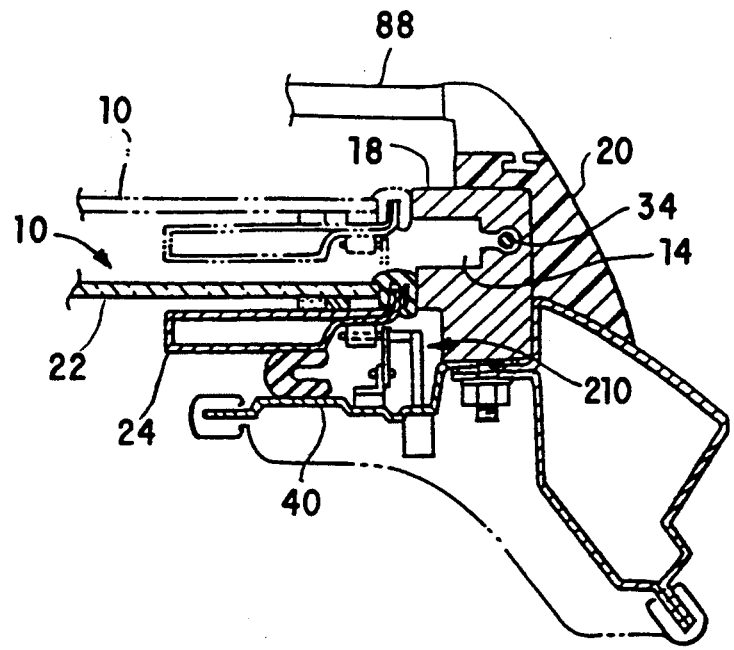
FIG. 11 is a cross-sectional view of FIG. 10 as seen along line XI—XI, wherein the front sliding roof, shown by a dotted line, is in a tilt up position.
Figure 12:
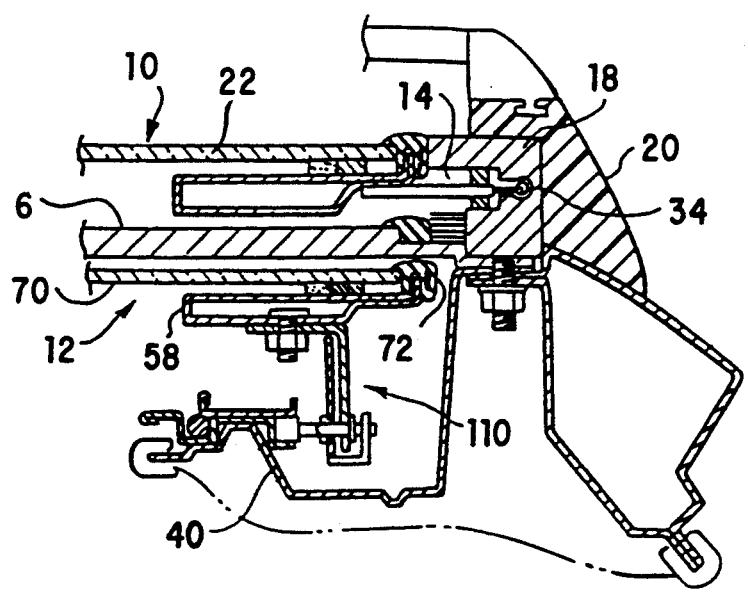
FIG. 12 is a cross-sectional view of FIG. 10 as seen along line XII—XII, wherein the front and rear sliding roofs are in their closed positions, respectively.

As is shown in FIGS. 10 to 12, a guide track 14 disposed on each side of the skylight window 7 is formed to curve gently from the front of the skylight window 7 to the rear thereof and consists of three guide track sections B, C and D, in that order, from the front of the top roof 4 toward the rear. The guide track section B extends over the length of the front sliding roof 10 in its closed position and crosses a plane including the front sliding roof 10 without any interference with the same. The guide track sections C and D extend over the lengths of the rear sliding roof 12 and stationary roof 6, and are positioned above a plane including the rear sliding and stationary roofs 12 and 6. The guide track 14 is formed as a slot or groove in a guide frame 18. Before the transitional point between the guide track sections B and C, the guide rail 18 forms a turnout track 14b' branching off from the guide track section B at approximately a right angle. Front and rear guide shoes 30a and 30b of the front sliding roof 10 engage the guide track 14 and turnout track 14b', respectively, when the roof 10 is closed.

The sliding sunroof 8 is provided with rear end tilt means mechanism 210 for the front sliding roof 10 and rear end tilt means, i.e., mechanism 110 for the rear sliding roof 12. The rear sliding roof 12 is provided, at its front end, with a rigid engagement member 104 (see FIG. 10) which is in engagement with the rear end of the front sliding roof 10 when the sliding sunroof is closed. This engagement member 104, as will be described later, serves to push up the end of the front sliding roof 10 so as to tilt up the front sliding roof 10 when the rear sliding roof 12 is tilted down or to push down the front end of the rear sliding roof 12 so as to tilt up the rear sliding roof when front sliding roof 10 is tilted down. The engagement member 104 has an integrally formed seal member portion 105 extending under the rear end of the front sliding roof 10. Further, the engagement member 104 is secured to the front end of the rear sliding roof 12 and extends over the width of the rear sliding roof 12.

Referring to FIGS. 10 and 13 to 19, a rear sliding roof tilt mechanism is shown at 110. The guide track 16 for the rear sliding roof 12 is shaped in the form of a channel extending in the lengthwise direction of the top roof 4 between each lower roof panel 40 and both of the rear sliding roof 12 in the closed position and the rear stationary roof 6. As is clearly shown in FIG. 13, the rear sliding roof tilt mechanism 110 comprises a roof bracket 48 secured to the rear roof frame 58 by bolts 122, a movable or drive bracket 124, an arm 126 mounted on a pivot pin 142 secured to the drive bracket 124 for pivotal movement, a first connecting member 128 and a stopper 130 formed with a recessed projection 136a and an end projection 130b.

The roof bracket 48 is provided with front and rear connecting pins 60 and 62 and the drive bracket 124 is formed with front and rear guide slots 134a and 134b for slidably receiving the front and rear connecting pins 60 and 62, respectively. Through the aid of this pin-slot engagement, the roof bracket 48 and drive bracket 124 are operationally connected to each other for relative sliding movement. The drive bracket 124 is further provided with a front connecting pin 136a having a guide shoe 138a and a rear connecting pin 136b having a guide shoe 138b. These guide shoes 138a and 138b are slidably received in the guide track 16. The drive bracket 124 is integrally formed with a side projection 140 engageable with the end projection 146b of the stopper 130.

The arm 126 is integrally formed with a hook portion 126a (see FIG. 15) engageable with the rear connecting pin 62 of the roof bracket 48, a recess or notch 126b engageable with a projection 128a (which is shown in detail in FIG. 19 and will be described later) of the first connecting member 128 and a shoulder 126c engageable with a shoulder 128b (which is shown in detail in FIG. 19 and will be described later) of the first connecting member 128.

Figure 16:
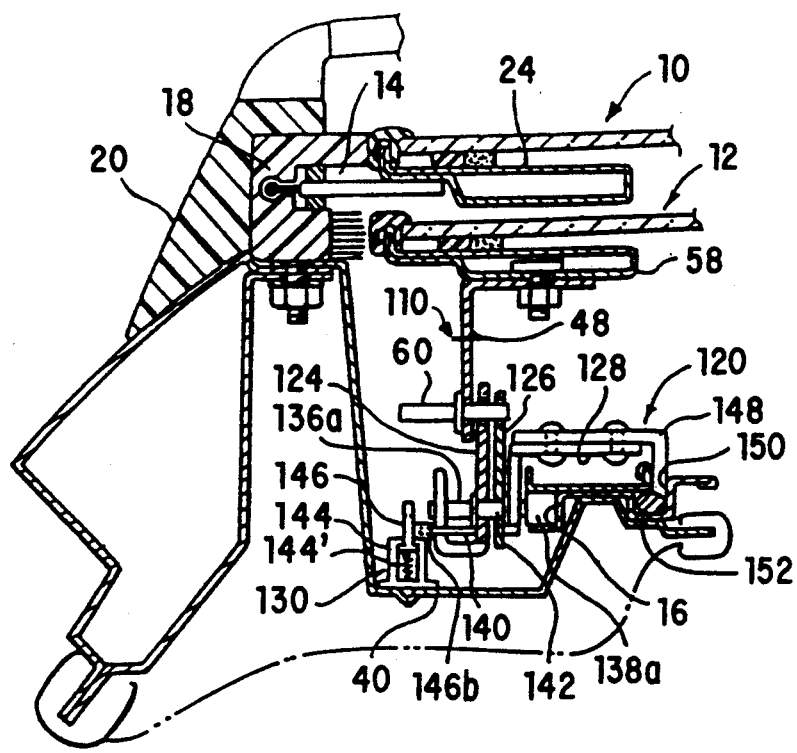
FIG. 16 is a cross-sectional view of FIG. 13 as seen along line XVI—XVI.
Figure 17:
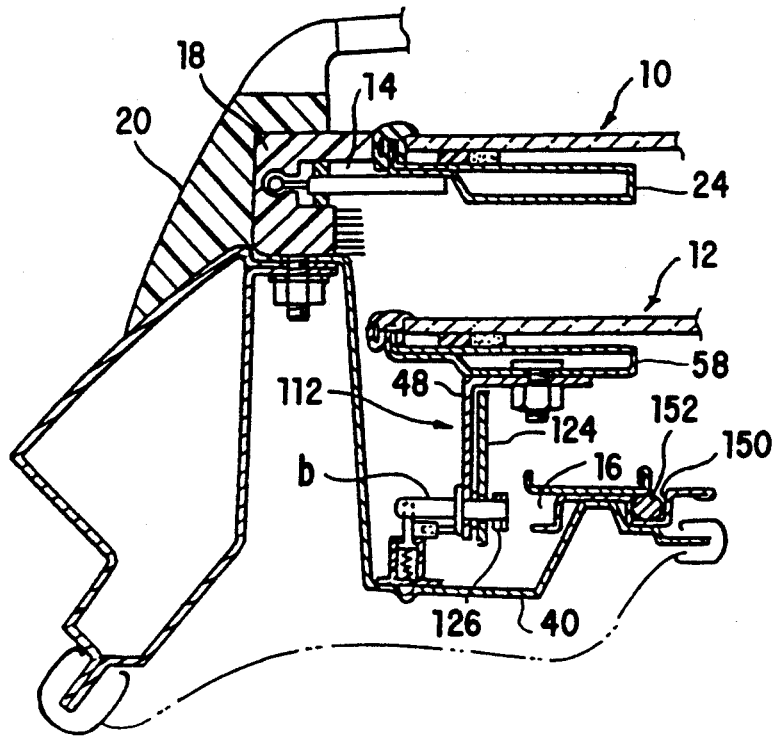
FIG. 17 is a cross-sectional view of FIG. 14 as seen along line XVII—XVII.

As is shown in detail in FIGS. 16 and 18, the stopper 130 comprises a holding block 144 secured to the lower roof panel 40, a stopper body 146 held or supported by the holding block 144 for vertical movement, and a spring coil 144' for urging the stopper body 146 upward. The stopper body 146 is integrally formed with a recessed projection 146a, vertically projecting therefrom, which is engageable with the rear connecting pin 132b of the roof bracket 48, and an end projection 146b, laterally extending therefrom, which is engageable with the side projection 140 of the drive bracket 124.

Referring to FIG. 19, a rear roof drive mechanism 120 is shown as including the first connecting member 128 constituting part of the rear roof tilt mechanism 110. The first connecting member 128 is attached with a second connecting member 148 having a leg portion 148' extending vertically downward. The leg portion 148' of the second connecting member 148 is connected at its lower end to a drive cable 152, which is received in a cable guide channel 150 (see FIG. 16) extending in the lengthwise of the car body. The drive cable 152 is operationally connected or coupled to a rear roof drive motor (not shown) located behind the front roof drive motor 38 (shown in FIG. 10).

Referring to FIGS. 11 and 20, the rear end tilt means 210 for the front sliding roof 10 is shown, including a position sensor switch 206, such as a timer switch, which is located so as to be operated by the front end of the front sliding roof 10 in the closed position. The position sensor switch 206 is, in more detail, adapted and designed to detect the front guide shoe 30a when the front sliding roof 10 is closed or pushed up at its rear end to tilt up the front sliding roof 10 so as to turn on; and to turn off when the tilted up front sliding roof 10 is moved rearward or when, in spite of positions of the front sliding roof 10, a specific predetermined time period lapses after turning on.

The rear end tilt means 210 for the front sliding roof 10 comprises a supporting stud 220 mounted on the lower roof panel 40, a lever 218 supported at its one end by the stud 220 and a hook 212 secured to the front sliding roof 10. The lever 218 is provided with a pin 214 mounted on its other end and is formed with a semicircular recess 216 formed in its upper edge at the middle. The hook 212 is located so as to be engageable with the pin 214. A cylindrical solenoid 222 is attached to the under surface of the lower roof panel 40. A spring loaded plunger 224, having a pin 226 mounted on its top end, extends vertically from the cylindrical cylinder 222 so as to locate the pin 226 above the semi-circular recess 216 of the lever 218. The solenoid 222 is connected to the position sensor switch 206 and is energized to retract the spring loaded plunger 224 against the spring force, thereof. The solenoid in this manner brings the pin 226 into engagement with the recess 216 of the lever 218 as shown in phantom by dotted lines in FIG. 20 when the position sensor switch 206 is closed or deenergized to allow the spring loaded plunger 224 to be retracted into the position as shown by solid lines in FIG. 20 when the position sensor switch 206 is open. In FIG. 20 the front sliding roof 10 is shown in solid lines as being in its closed position and in dotted lines as being in its tilt up position.

As is shown in FIG. 2, when the front sliding roof 10 is moved to the closed position, the position sensor switch 206 is closed or turned on by the front end of the front sliding roof 10. However, the position sensor switch 206 will turn off after a lapse of the predetermined time period after closing, so that the solenoid 222 is deenergized to allow the spring loaded plunger 224 to protrude to its extended or upper position. After the position sensor switch 206 turns off, when the front sliding roof 10 is tilted up at its rear end through a movement of the rear guide shoes 30b in the turnout tracks 14b', during the rearward movement of the front sliding roof 10, the hook 212 pulls up the pin 214 of the lever 218, so as to turn the lever 218 in a counterclockwise direction as viewed in FIG. 20.

Figure 13:
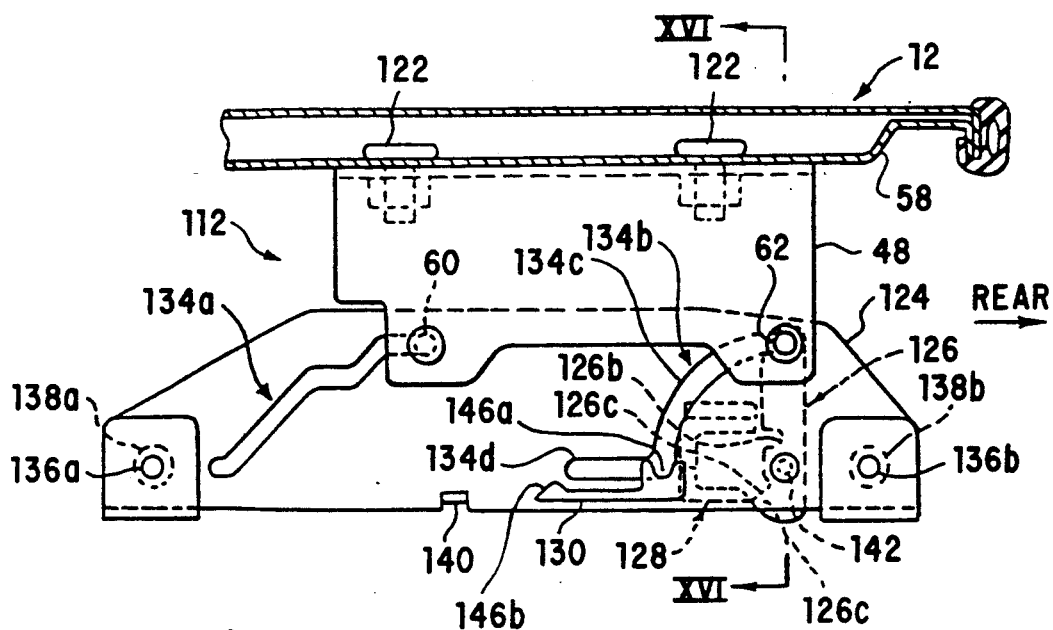
FIG. 13 is a side view of a sliding mechanism for the rear sliding roof, which is in the closed position.
Figure 14:
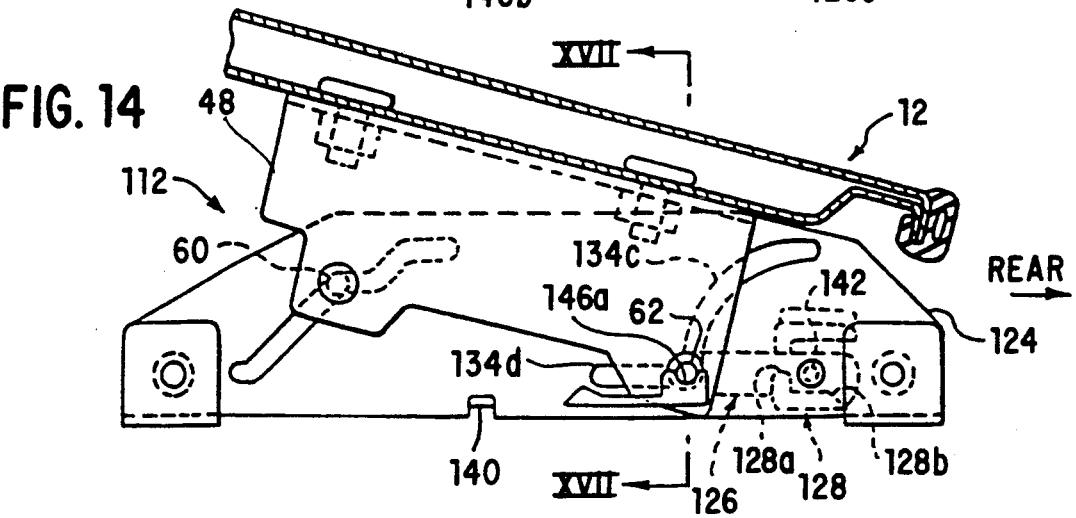
FIG. 14 is a side view of the sliding mechanism in a tilt down position.
Figure 15:
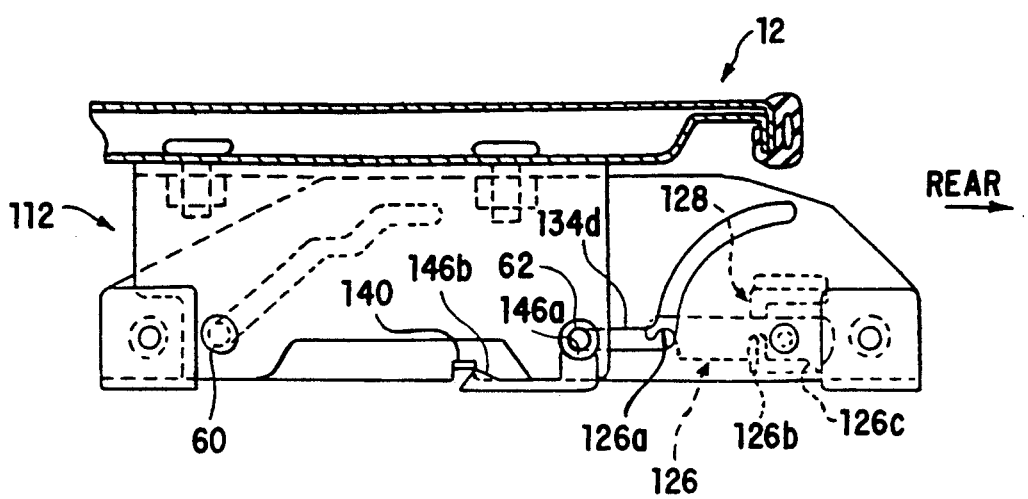
FIG. 15 is a side view of the sliding mechanism in a pre-opening position.

In the operation of the power sliding sunroof constructed as described above, when it is desired to open the rear sliding roof 12 while leaving the front sliding roof 10 closed, the rear roof drive motor, behind the motor 38 for the front sliding roof 10, is actuated in order to continuously move the rear sliding roof 12 from the closed position shown in FIG. 13 to the open position shown in FIG. 10, passing through the down, i.e. pre-opening, position, shown in FIG. 15 and the tilt up position, shown in FIG. 14. It is to be noted that in the closed position, the front and rear connecting pins 60 and 62 are located to abut the upper shoulders of the front and rear guide slots 134a and 134b, respectively, the arm 126 stands upright with its upper hook 126a engaged by the rear connecting pin 62, the first connecting member 128 is located in a position where the shoulder 128b is out of contact or engagement with, but located just before, the lower hook 126b of the arm 126, and the stopper 130 is located with the recessed projection 146a adjoining the lower end of the circularly arcuate portion 134c of the rear guide slot 134b. When the rear roof drive motor is actually actuated to open the rear sliding roof 12, in the beginning, the first connecting member 128, attached to the second connecting member 148, is moved rearward, i.e., in a direction toward the right as viewed in FIG. 13 and, to thereby, bring the shoulder 128b of the first connecting member 128 into contact with the shoulder 126c of the arm 126 and push it back, so that the arm 126 turns in the counterclockwise direction about the pivot pin 142 to force the rear connecting pin 62 to slide down to the bottom of the circularly arcuate guide section 134c of the rear guide slot 134b. Simultaneously, the front connecting pin 60 slides in the front guide slot 134a to a position shown in FIG. 14. In this way, the rear sliding roof 12 is tilted down.

In the tilt down position shown, the rear connecting pin 62 is brought into engagement with the recessed projection 146a of the stopper body 146, and the projection 128a of the first connecting member 128 is brought into engagement with the lower hook 126b of the arm 126. When continuously moving the first connecting member 128 rearward from the tilt up position shown in FIG. 14, the first connecting member 128 forces the arm 126 in engagement with the projection 128a to move rearward. Accordingly, the arm 126 moves the drive bracket 124 rearward through the pivot pin 142 secured to the drive bracket 124. At this time, the rear connecting pin 62 is engaged by the recessed projection 146a of the stopper body 146 of the stopper 130 and, therefore, can not move. The pin 62 is therefore disengaged from the lower hook 126b of the arm 126. Thereby, the drive bracket 124 moves rearward, leaving the rear connecting pin 62 engaged by the recessed projection 146a of the stopper member 146 of the stopper 130. Thereafter, when rear connecting pin 62 reaches the end of the horizontal guide section 134d of the rear guide slot 134b, the front connecting pin 60 reaches the lower end of the front guide slot 134a, so as to bring the rear sliding roof 12 into a pre-opening position and hold it in a horizontal plane which is lower than a plane in which the closed rear sliding roof 12 previously was, as is shown in FIG. 15.

At the end of this movement, the stopper 130 is pushed down against the coil spring 144' in the holding block 144 by means of engagement between the laterally extending end arm 146b of the stopper 130 and the side projection 140 of the drive bracket 124, so as to disengage the first rear connecting pin 132b from the recessed projection 146a of the stopper 130. When further continuously moving the first connecting member 148 rearward, the drive bracket 124, holding the rear sliding roof 12 horizontal, is moved rearward to the open position shown by double dotted line 102 in FIG. 10, thereby partly opening the skylight window 7.

The rear sliding roof 12 can be closed by reversing the rear roof drive motor. That is, when the rear roof drive motor is reversed, the rear sliding roof 12 is moved from the closed position shown in FIG. 10 to the tilt down position shown in FIG. 14 through the pre-opening position shown in FIG. 15. Completely closing the rear sliding roof 12, i.e. moving the rear sliding roof 12 from the tilt down position shown in FIG. 14 to the closed position shown in FIG. 13, is performed by tilting down the front sliding roof 10 while continuously keeping the rear roof drive motor reversed. For this reason, the closing movement or operation of the rear sliding roof 12 from the tilt down position to the closed position will be described after the following description of opening the front sliding roof 10.

Figure 21:
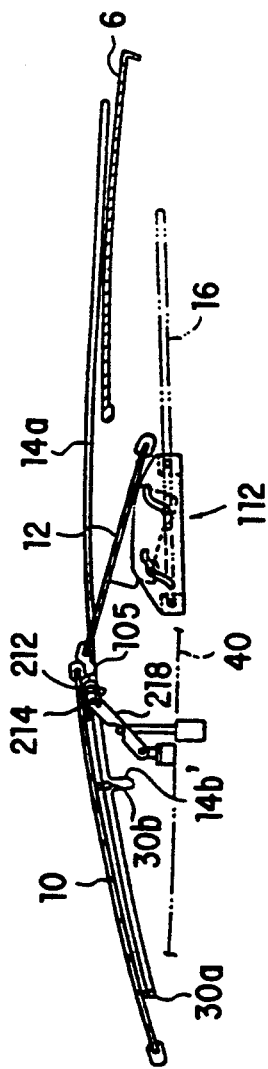
FIG. 21 is a schematic illustration, showing the sliding sunroof in which the rear sliding roof is in the tilt down position.

When opening the front sliding roof 10 from the closed position shown in FIG. 10 while leaving the rear sliding roof 12 closed, the front roof drive motor 38 is actuated. When the front roof drive motor 38 is actuated, the rear roof motor is always automatically actuated to move the rear sliding roof 12 to the tilt down position shown in FIG. 14 before the front roof drive motor 38 actually operates. During this tilt down movement of the rear sliding roof 12, the front sliding roof 10 is forced to be moved or pushed up at the rear end thereof by means of the engagement between the rear end of the front sliding roof 10 and the engagement member 104 fixed to the front end of the rear sliding roof 12, so as to tilt up about the front guide shoe 30a as shown in FIG. 21. Then, the front roof drive motor 38 actually operates to move the front sliding roof 10 rearward while leaving the rear roof drive motor actuated. The rear roof drive motor, however, automatically stops when the rear sliding roof 12 reaches the pre-opening position shown in FIG. 15 o FIG. 22. Since although the rear roof drive motor automatically stops immediately after the down movement to the pre-opening position, the front roof drive motor 38 continuously operates, the front sliding roof 10 further moves rearward along the guide track 14 until it reaches the full open position over the rear stationary roof 6 shown by double dotted line 100 in FIG. 10. At the time the front sliding roof 10 reaches the full open position, the front roof drive motor 38 automatically stops.

Figure 22:
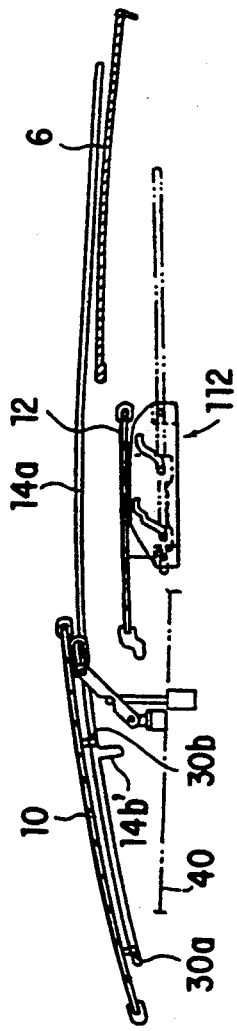
FIG. 22 is a schematic illustration, showing the sliding sunroof in which the rear sliding roof is in the pre-opening position.
Figure 23:
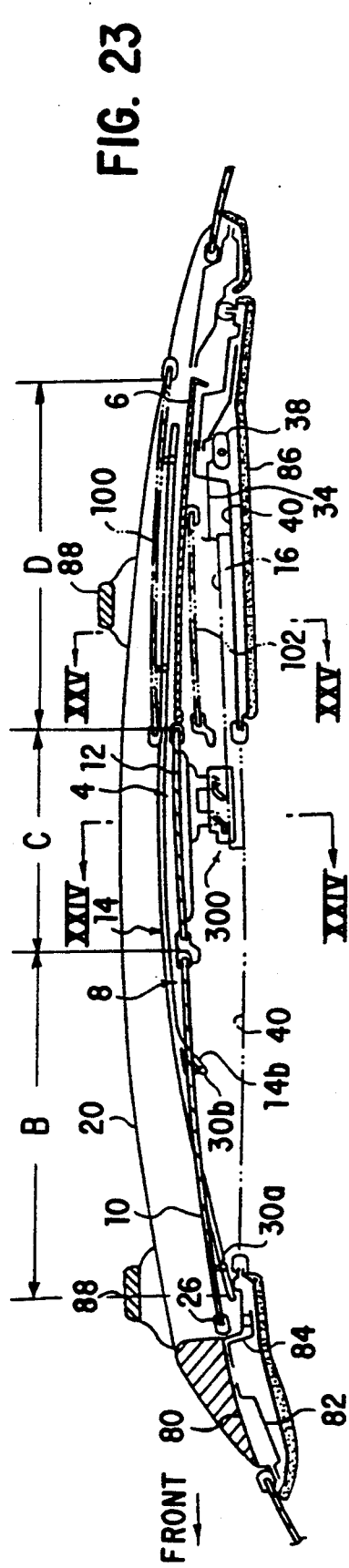
FIG. 23 is a cross-sectional view, showing a sliding sunroof in accordance with still another preferred embodiment of the present invention, in which front and rear sliding roofs are closed.
Figure 24:
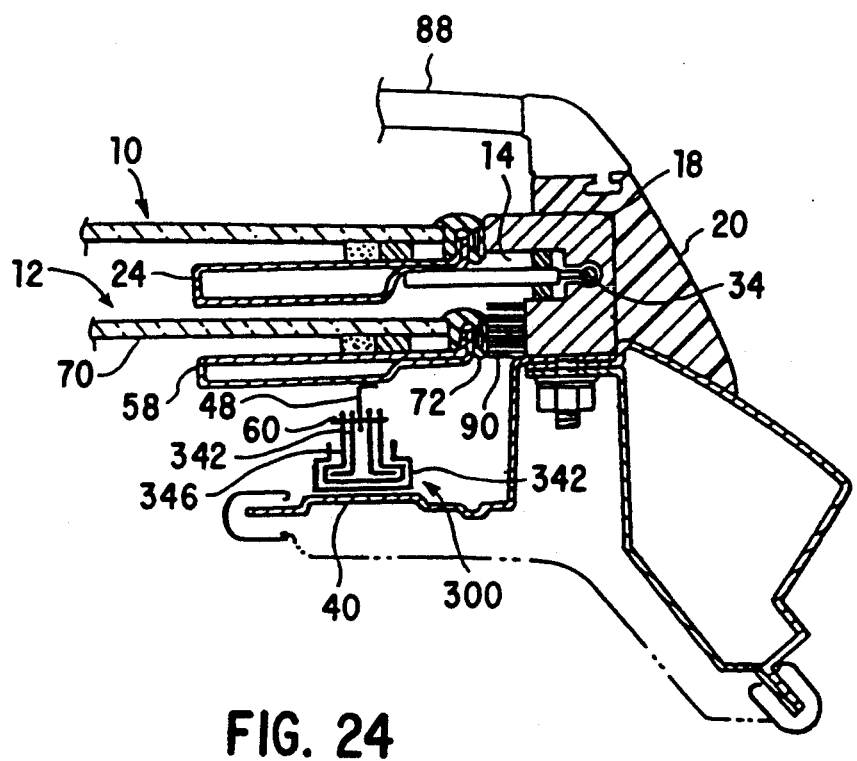
FIG. 24 is a cross-sectional view of FIG. 23 as seen along line XXIV—XXIV.
Figure 25:
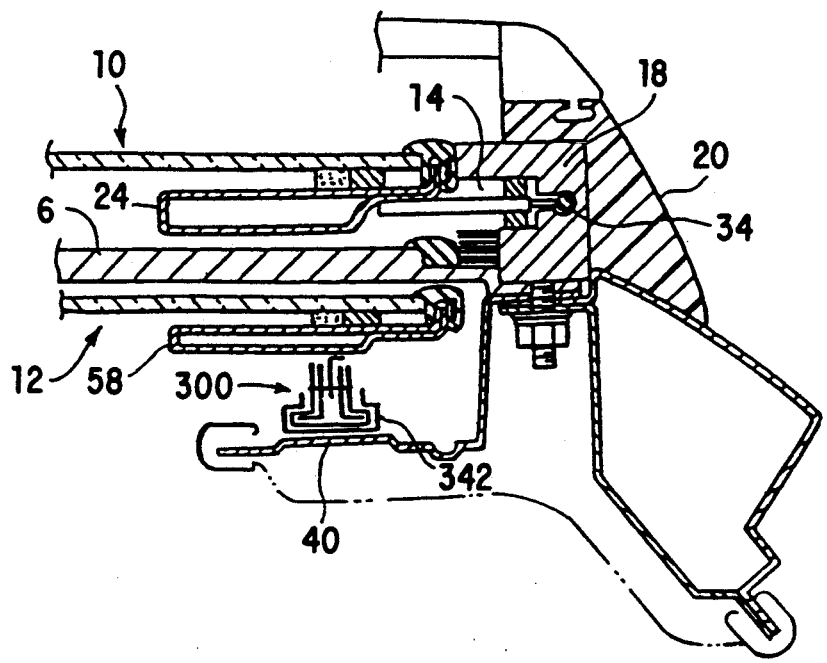
FIG. 25 is a cross-sectional view of FIG. 23 as seen along line XXV—XXV.

Closing the front sliding roof 10 is performed by simply reversing the front roof drive motor 38. That is, when reversing the front roof motor 38, the front sliding roof 10 is forced forward toward the closed position When the front sliding roof 10 reaches a position as shown in FIG. 22 which is located just before the closed position and in which the rear guide shoe 30b is in the guide track 14 just before the turnout guide track 14b', the rear roof drive motor is automatically actuated again to move the drive bracket 124. The rear sliding roof 12 is thereby turned up about the rear connecting pin 62 from the pre-opening position to the tilt down position so as to timely bring the engagement member 104 fixed to the front end of the rear sliding roof 12 into engagement with the rear end of the front sliding roof 10. At this time, as was previously described, since the solenoid 222 is kept deenergized to allow the spring loaded plunger 224 to protrude, the lever 218 is kept pulled up to allow the pin 214 to be engaged by the hook 212 secured to the front sliding roof 10 as shown in FIG. 21. At the moment the front sliding roof 10 reaches the closed position but before it is tilted down, the position sensor switch 206 is closed or turned on by the front end of the front sliding roof 10, and the solenoid 222 is energized to retract the spring loaded plunger 224, thereby forcing the lever 218 to turn in the clockwise direction by means of the engagement between the pin 226 of the spring loaded plunger 224 and the recess 216 of the lever 218, so as to pull down the rear end of the front sliding roof 10, i.e., to tilt down the front sliding roof 10. As the front sliding roof 10 is tilted down and the drive bracket 124 continuously moves forward, the rear end of the front sliding roof 10 pushes down the front end of the rear sliding roof 12, so that the rear sliding roof 12 is pushed and turned up, about the front end in engagement with the rear end of the front sliding roof 10 as a pivot line of turning movement, to the closed position shown in FIG. 10. Because the position sensor switch 206 opens after a lapse of the predetermined time period after closing or turning on, the solenoid 222 is deenergized after closing the front and rear sliding roofs 10 and 12, so as to allow the spring loaded plunger 224 to protrude or move up to the upper position, leaving the lever 218 turned down as shown by solid lines in FIG. 20.

It is to be noted that the front and rear roof drive motors and their controls are adapted and designed to timely operate so that when moving down the rear sliding roof 12 to the pre-opening position through the tilt down position for opening the skylight window 7, the front sliding roof 10 is slightly moved rearwards. This forces the rear guide shoe 30b to enter the guide track 14a as shown in FIG. 22 and maintain the front sliding roof 10 in the tilt up position until the rear sliding roof 12 is moved back forward to the tilt down position.

At almost the same time the rear sliding roof 12 returns to the tilt down position shown in FIG. 14, the front roof drive motor is again actuated to operate or rotate in the normal direction, thereby moving the front sliding roof 10 forwards. When the front sliding roof 10 reaches the closed position and locates the rear guide shoe 30b just above the turnout track 14b', it closes the position sensor switch 206 to energize the solenoid 222 to retract the spring loaded plunger 224, so as to pull down the sliding roof 10 about the front guide shoe 30a, thereby bringing the rear end of the front sliding roof 10 into engagement with the engagement member 104 of the rear sliding roof 12 and push dow the front end of the rear sliding roof 10. Because the drive bracket 124 is continuously moving forwards, it forces the rear sliding roof 12 to swing or turn up about the front edge, which forms a center line of swinging or turning movement.

Referring now to FIGS. 1 and 23 to 28B, a power sliding sunroof in accordance with still another preferred embodiment of the present invention is shown as having the same arrangement of sliding sunroof as that of the first embodiment, except for a sliding roof drive means or mechanism for the rear sliding roof. The following description is directed only to the rear roof drive means which is different from that of the first embodiment.

As is shown in FIGS. 1 and 23 to 25, a rear sliding roof 12 is connected or coupled to a rear sliding roof drive means 300 for tilting and sliding movement. As was previously described, a top roof 4 of a car body 2, which has a lower roof panel 40 formed with an opening enclosed by a seaming welt 94 to define a skylight window 7, is provided thereon with guide frames 342 on both sides of the opening. Each guide frame 342 comprises a hollow guide base 342a and side walls 342b. The guide frame 342 supports the rear sliding roof drive means 300 which is operationally coupled to a roof bracket 48, fixedly mounting thereon the rear sliding roof 12, by front and rear connecting pins 60 and 62 secured to front and rear legs 48a and 48b of the roof bracket 48.

Referring to FIGS. 26A to 26C, the rear sliding roof drive means includes first or inner and second or outer guide brackets 344 and 346. The second or outer guide bracket 346 comprises a hollow base 346a and a pair of outer guide bracket members 346b forming a space therebetween. The hollow base 346a is received in the hollow guide base 342a for lengthwise sliding movement. Each outer guide bracket 346b is formed with a vertical guide slot 346c.

The first or inner guide bracket 344 comprises a pair of inner bracket members 344b, formed as one piece, spaced apart from each other, and base plate 344a integrally formed with the respective bracket members 344b. The inner guide bracket 334 is received in the outer guide bracket 346 with the base plate 344a slidably received in the hollow base 346a of the outer guide bracket 346, and the bracket members 344b are positioned between the bracket members 346b of the outer guide bracket 346 with a clearance so as to slide usually relative to the outer guide bracket 346 over a certain distance or, under certain conditions, to move together with the outer guide bracket 346. Each inner bracket member 346b s formed with a pair of, or front and rear, substantially L-shaped guide slots 344A and 344B, each consisting of an inclined guide slot section and a horizontal guide slot section. These front and rear guide slots 344A and 344B are formed upside down and right side left with respect to each other. The base plate 344a is integrally provided, at its rear end, with a connecting arm 352 by which the base plate is connected to a drive cable 50. The base plate 344a is further integrally provided with a coupling pin 354 engageable with a swingable hook 54.

The front connecting pin 60 of the roof bracket 48 is slidably received in both the vertical guide slot 346c of the outer guide bracket 346 and the substantially L-shaped front guide slots 344A of the inner guide brackets 344. The rear connecting pin 62 of the roof bracket 48 is slidably received in the substantially L-shaped rear guide slots 346B of the inner guide brackets 344.

Drive cable 50, constituting part of the rear sliding roof drive means 300, is attached to a guide shoe 64 which is connected to the connecting arm 352 of the base plate 344a of the inner guide bracket 344. As was previously described with respect to the first embodiment, the drive cable 50, which is concealed along with its guide shoe 64 in a guide channel 66 (see FIG. 26C) extending in the lengthwise direction of the guide frame 342, is connected to an output shaft of the rear roof drive motor (which is located behind the front roof drive motor 38, shown in FIG. 1, side by side), to operationally couple inner guide bracket 344 to the rear roof drive motor. In this way, the inner guide bracket 344 is moved in the lengthwise direction when the rear roof drive motor is actuated in either direction.

The swingable hook 54 is mounted on a shaft 54a standing vertically at rear part of the hollow guide base 346a of the outer guide bracket 346 for pivotal movement and is urged by a spring 54b in the clockwise direction as is viewed in FIG. 26B. The hook 54 is integrally formed with first and second arms 54d and 54e to define therebetween a coupling recess 54c to be engaged by the coupling pin 354 of the base plate 344a of the inner guide bracket 344. The hook 54 is further integrally formed with a third arm 54f engageable with a notch 68 formed in one side wall 342b of the guide frame 342. The first and third arms 54d and 54f are provided with rollers 54g and 54h, respectively.

The skylight window 7 is opened, while leaving the front sliding roof 10 closed, by moving the rear sliding roof 12. In the closed position of the sliding sun roof 8, the rear sliding roof drive means 300 is situated as is shown in FIGS. 26A to 26C. The inner and outer guide brackets 344 and 346 are located at their forefront positions where the front connecting pin 60, supported by the roof bracket 48, engages both the uppermost ends both of the L-shaped front guide slot 344A of the inner guide bracket 344 and the vertical guide slot 346c of the outer guide slot 346. The rear connecting pin 62 supported by the roof bracket 48 engages the uppermost rear end of the L-shaped rear guide slot 344B of the inner guide bracket 344. The swingable hook 54, at the closed position of the sliding sunroof 8, is forced by the spring 54b to enter and engage the notch 68 of the one side wall 342b of the guide frame 342.

To partially open the skylight window 7 by moving the rear sliding window 12 only, when actuating the rear roof drive motor located behind the motor 38 (shown in FIG. 2), the inner guide bracket 344, operationally connected to the rear roof drive motor through the connecting arm 52 and the guide shoe 64 connected to the drive cable 50, slides rearward in the hollow guide base 346a of the outer guide bracket 346 by a certain distance equal to the length of the horizontal section of the L-shaped rear guide slot 344B which is equal to a horizontal length of the inclined section of the L-shaped front guide slot 344A. During the rearward sliding movement of the inner guide bracket 344, the front connecting pin 60 moves or slides forwardly down in the inclined section of the L-shaped front guide slot 344A relative to the inner guide bracket 344, while the rear connecting pin 62 stays within the horizontal section of the L-shaped guide slot 344B, to pull down the front end of the rear sliding roof 12, thereby tilting down the rear sliding roof 12 about the rear connecting pin 62 as shown in FIG. 27A.

Figure 28A:
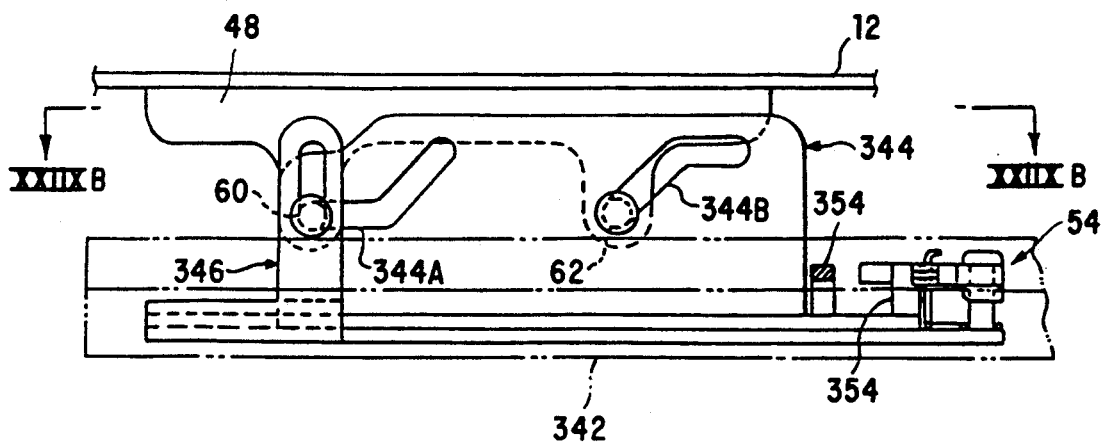
FIG. 28A is a side view of the sliding mechanism, which is in a pre-opening position.
Figure 28B:
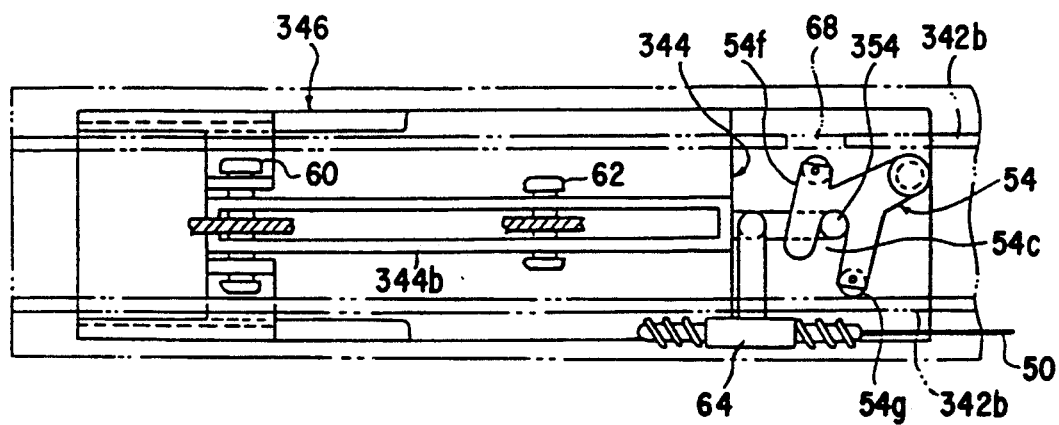
FIG. 28B is a cross-sectional view of FIG. 28A as seen along line XXIIXB—XXIIXB.

When continuously pulling the drive cable 50 to move the inner guide bracket 344 rearward by the same distance as the length of the horizontal section of the L-shaped front guide slot 344A which is equal to a horizontal length of the inclined section of the L-shaped rear guide slot 344B, the rear connecting pin 62 moves forwardly and down in the inclined section of the rear guide slot 344B relative to the inner guide bracket 344, while the front connecting pin 60 stays within the horizontal section of the L-shaped front guide slot 344A, to pull down the rear end of the rear sliding roof 12, thereby turning the rear sliding roof 12 about the front connecting pin 60 so as to level the rear sliding roof 12 and locate it in the pre-opening position as shown in FIG. 28A.

At the same time as the inner guide bracket 344 undergoes continuous rearward movement to the preopening position, the connecting pin 56 is brought into contact with the first arm 54d of the swingable hook 54 and forces the swingable hook 54 to swing in the counterclockwise direction against the spring 54b until the roller 54g of the first arm 54d is stopped by the other side wall 342b of the guide frame 342. During the swinging movement, the hook 54 catches the coupling pin 354 in the recess 54c and makes its third arm 54f escape from the notch 68 of the one side wall 342b of the guide frame 342. Since the hook 54 is prevented from further swinging in the counterclockwise direction by the abutment of the first arm 54g against the other side wall 342b of the guide frame 342 and the third arm 54 has escaped from the notch 68 of the one side wall 342b of the guide frame 342, the rearward movement of the inner guide bracket 344 caused by the drive cable 50, is transmitted to the outer guide bracket 346 through the coupling of the coupling pin 354 to the hook 54. Accordingly, after the leveling of the rear sliding roof 12, the inner and outer guide brackets 344 and 346 are moved rearward as one unit to slide the rear sliding roof 12 to the open position as shown by dotted line 102 in FIG. 23 where the rear sliding roof 12 is positioned under the rear stationary roof 6.

Figure 27A:
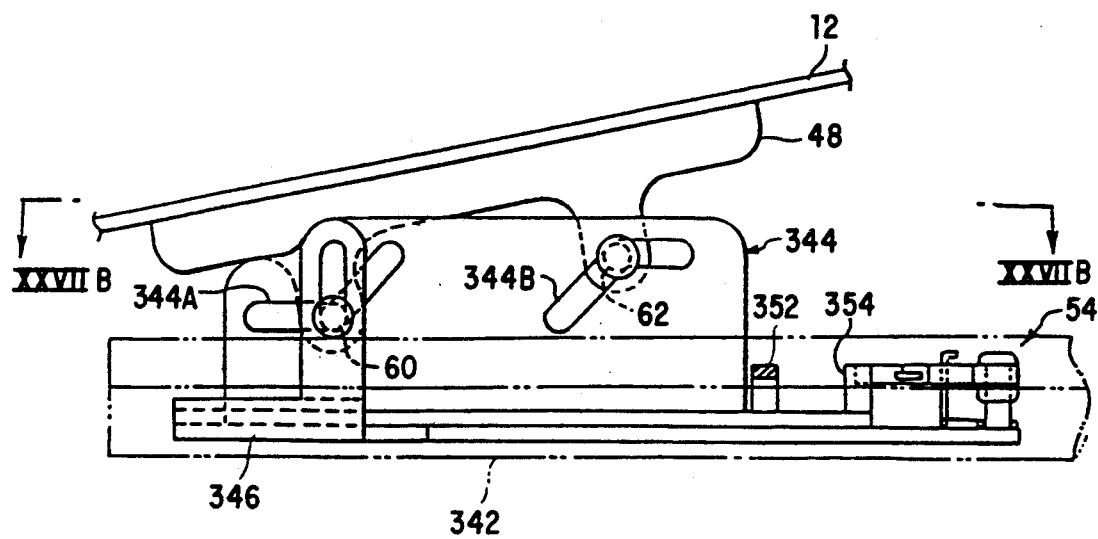
FIG. 27A is a side view of the sliding mechanism, which is in a tilt down position.
Figure 27B:
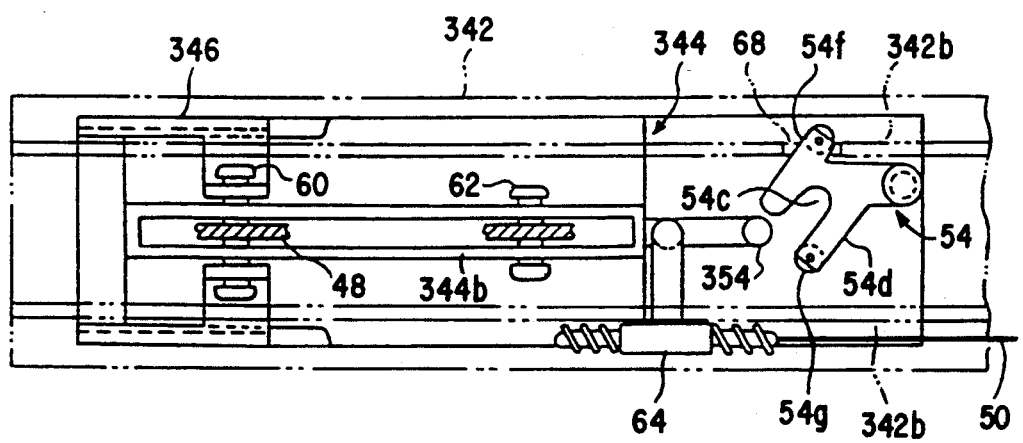
FIG. 27B is a cross-sectional view of FIG. 27A as seen along line XXVIIB—XXVIIB.

When it is desired to partly open the skylight window 7 by moving the front sliding roof 10 only, while leaving the rear sliding roof 12 closed, the rear roof drive motor is automatically actuated first when an operation is made to open the front sliding roof 10 so as to move the rear sliding roof 12 to the tilt down position shown in FIG. 27A. Thereafter, the front roof drive motor 38 actually starts or operates to move the guide shoes 30 along, and toward the rear ends of, the guide tracks 14 through the drive cable 34. At the beginning of rearward movement of the front sliding roof 10, the front sliding roof 10 is pushed up at the rear end, above the rear sliding roof 12, while the rear guide shoes 30b are in the turnout tracks 14a. The front sliding roof 10 continues to move rearward, over the rear sliding roof 12 in the closed position, in the lengthwise direction until the front end of the front sliding roof 12 is located above the front end of the rear stationary roof 6 as is shown by double-dotted line 100 in FIG. 23. In this way, the skylight window 7 is partly opened. The rear sliding roof 12 may be adapted and designed either to be left at the tilt down position or to be returned to the closed position, while the front sliding roof 10 moves to partially open the skylight window 7.

The front and rear sliding roofs are operated and closed independently from each other in a reverse manner by simply reversing their associated roof drive motors.

In this embodiment, the rear sliding roof 12, if desired, may be adapted to select a ventilation position where it is maintained in the tilt down position shown in FIG. 27A, while leaving the front sliding roof 10 closed. In the ventilation position, the rear sliding roof 12 allows the inside of the vehicle to be ventilated. Because the rear end of the rear sliding roof 12 conforms with the front end of the rear stationary roof 6 to provide a smooth transition between the rear sliding and stationary roofs 12 and 6, air streams flow along the rear sliding roof 12, passing the smooth transitional portion of the roof, so as not to produce harmful resistance and/or noise offensive to the ear. The selection of a ventilation position of the rear sliding roof 12 is easily realized by, for instance, providing a known control circuit for the front and rear roof drive motors in a manner well known to those skilled in the art.

It is understood that although the invention has been described in detail with respect to preferred embodiments, nevertheless, various other embodiments and variants are possible which are within the spirit and scope of the invention, and such embodiments and variants are intended to be covered the following claims.

What is claimed is:

1. A sliding sunroof for opening and closing a skylight window formed between a front stationary roof and a rear stationary roof of a car body of an automotive vehicle, comprising:
   a front sliding roof, having a front end and a rear end, movable between a front roof closed position and a front roof open position;
   a rear sliding roof movable independently of said front sliding roof between a rear roof closed position and a rear roof open position, said front sliding roof being located between said front stationary roof and said rear sliding roof in said front roof closed position, said rear sliding roof being located between said front sliding roof and said rear stationary roof in said rear roof closed position;

front roof guide means for moving and guiding said front sliding roof between said front roof closed position and said front roof open position and locating said front sliding roof over said rear stationary roof in said front roof open position so that the front end of said front sliding roof is located substantially right above a front end of said rear stationary roof, said front roof guide means comprising a pair of guide tracks disposed on opposite sides of said skylight window, each guide track including at least a guide track section extending to a position vertically higher than said rear sliding roof in said rear roof closed position; and rear roof guide means for moving and guiding said rear sliding roof between said rear roof closed position and said rear roof open position and locating said rear sliding roof under said rear stationary roof in said rear roof open position so that a front end of said rear sliding roof is located substantially right under said front end of said rear stationary roof.

2. A sliding sunroof as defined in claim 1, wherein said front roof guide means further comprises front sliding roof tilt means for pushing up a rear end of said front sliding roof so as to tilt up the rear end of said front sliding roof before said front sliding roof is moved toward said front roof open position.

3. A sliding sunroof as defined in claim 2, wherein each guide track further includes a trailing guide track section extending above and over said rear stationary roof.

4. A sliding sunroof as defined in claim 3 wherein said front sliding roof tilt means comprises a turnout guide track disposed just before said guide track section.

5. A sliding sunroof as defined in claim 3, wherein said front sliding roof tilt means comprises a transitional guide track section disposed just before said guide track section.

6. A sliding sunroof as defined in claim 4, wherein said front sliding roof tilt means further moves down said rear end of said front sliding roof so as to place said front sliding roof into said front roof closed position.

7. A sliding sunroof as defined in claim 6, wherein said front sliding roof tilt down means comprises electrical reciprocal means for allowing said front sliding roof to be tilted up and tilting down said rear end of said front sliding roof, and a position sensor switch for sensing when said front sliding roof is in said front roof closed position to energize said electrical reciprocal means for a predetermined time period so as to force a tilt down of said rear end of said front sliding roof.

8. A sliding sunroof as defined in claim 7, wherein said electrical reciprocal means comprises an electric solenoid and a plunger.

9. A sliding sunroof as defined in claim 6, wherein said rear roof guide means comprises a pair of guide tracks disposed on opposite sides of said skylight window under said rear stationary roof.

10. A sliding sunroof as defined in claim 9, wherein said rear roof guide means further comprises rear sliding roof tilt means for moving down a rear end of said rear sliding roof while maintaining a front end of said rear sliding roof in engagement with said rear end of said front sliding roof so as to tilt down said rear sliding roof before moving said rear sliding roof to said rear roof open position.

11. A sliding sunroof as defined in claim 10, wherein said rear sliding roof tilt means includes means for moving down the front end of said rear sliding roof so as to place said rear sliding roof substantially parallel to said rear stationary roof before moving said rear sliding roof to said rear roof open position.

* * * * *